(12) United States Patent
Maginness

(10) Patent No.: US 8,156,938 B2
(45) Date of Patent: Apr. 17, 2012

(54) HEAD SUPPORT

(76) Inventor: Joseph Gabriel Maginness, Beflast (GB)

( * ) Notice: Subject to any disclaimer, the term of this patent is extended or adjusted under 35 U.S.C. 154(b) by 769 days.

(21) Appl. No.: 11/629,802

(22) PCT Filed: Jun. 20, 2005

(86) PCT No.: PCT/GB2005/002429
§ 371 (c)(1),
(2), (4) Date: Jun. 27, 2008

(87) PCT Pub. No.: WO2005/122838
PCT Pub. Date: Dec. 29, 2005

(65) Prior Publication Data
US 2008/0271742 A1 Nov. 6, 2008

(30) Foreign Application Priority Data
Jun. 18, 2004 (GB) .................................. 0413674.3

(51) Int. Cl.
*A61G 15/00* (2006.01)
*A61F 11/00* (2006.01)
*A61F 5/37* (2006.01)
(52) U.S. Cl. ...................... 128/845; 128/857; 128/874
(58) Field of Classification Search .................. 128/845, 128/857, 874; 5/640, 637, 636, 645, 647, 5/655.3, 632, 657, 652, 643; 297/397; 2/463, 2/464, 465
See application file for complete search history.

(56) References Cited

U.S. PATENT DOCUMENTS

| | | | |
|---|---|---|---|
| 245,639 A | 8/1881 | Lay | |
| 2,172,178 A | 9/1939 | Rosenberg | |
| 4,037,763 A | 7/1977 | Turchen | |
| 4,095,726 A | 6/1978 | Hechler et al. | |
| 4,114,197 A * | 9/1978 | Morton | 2/423 |
| 4,236,264 A | 12/1980 | Britzman | |
| 4,821,339 A * | 4/1989 | Fair | 2/462 |
| 5,431,317 A | 7/1995 | Kliot | |
| 5,505,523 A | 4/1996 | Wang | |
| 5,590,825 A | 1/1997 | Murdock | |
| 5,611,601 A | 3/1997 | Cowgur | |
| 5,676,293 A | 10/1997 | Farris | |
| 6,336,576 B1 | 1/2002 | Easter | |
| 6,409,060 B2 | 6/2002 | Donine | |
| 6,973,691 B1 * | 12/2005 | Cordova et al. | 5/652 |
| 7,681,769 B2 | 3/2010 | Kramer | |
| 7,788,751 B1 | 9/2010 | Diemer et al. | |
| 2001/0029630 A1 * | 10/2001 | Cortese et al. | 5/636 |
| 2002/0050009 A1 | 5/2002 | Ley | |
| 2004/0064893 A1 | 4/2004 | Sharp | |
| 2004/0124685 A1 | 7/2004 | Buch | |
| 2004/0262865 A1 | 12/2004 | Sigler | |
| 2006/0138188 A1 | 6/2006 | Kramer | |

FOREIGN PATENT DOCUMENTS

FR 2 452 299 10/1980
NL 1017050 C2 7/2002

* cited by examiner

*Primary Examiner* — Patricia Bianco
*Assistant Examiner* — Ophelia Hawthorne
(74) *Attorney, Agent, or Firm* — Ronald E. Greigg

(57) ABSTRACT

A head support having a body with a recess defined along a recess edge of the body to receive a person's lower jaw. A torso engaging edge of the body opposite the recess edge being formed to engage a portion of the person's torso when the person is sitting in a substantially upright position to prevent the recess from falling away from the person's lower jaw area.

25 Claims, 13 Drawing Sheets

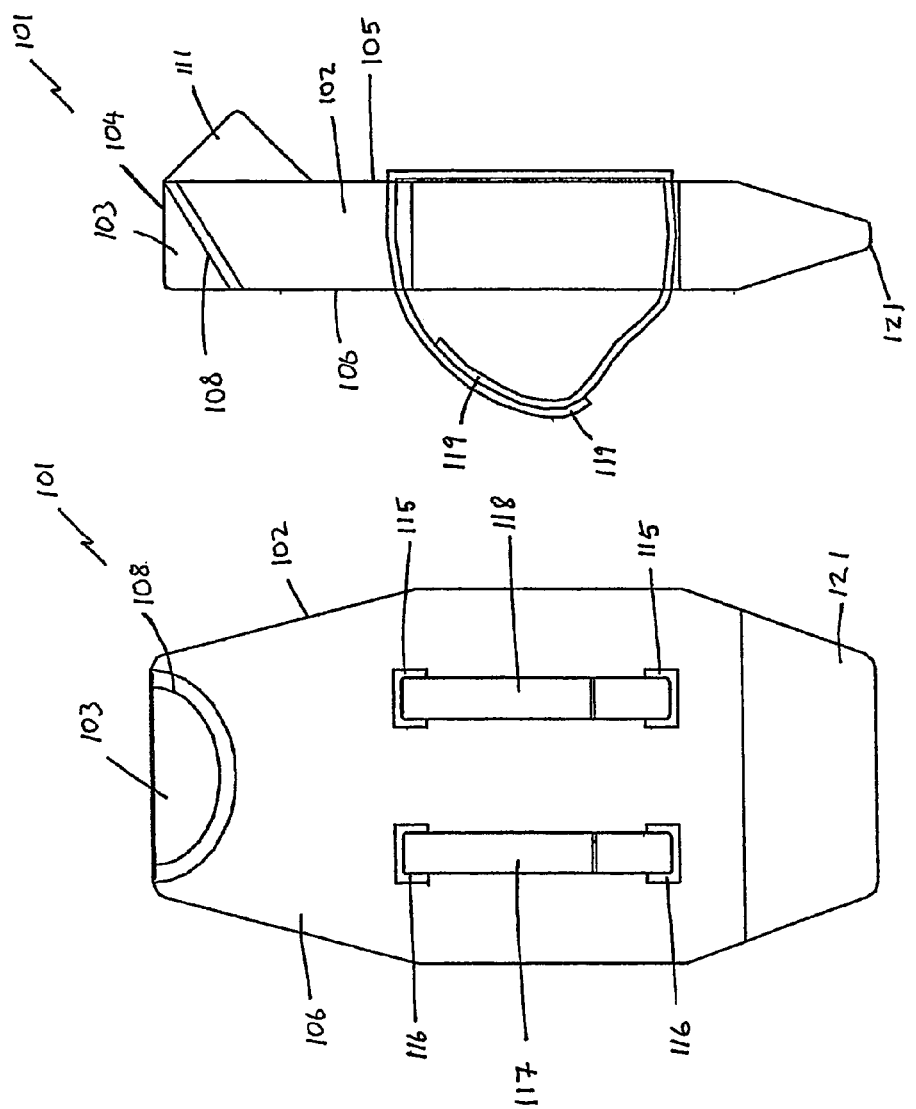

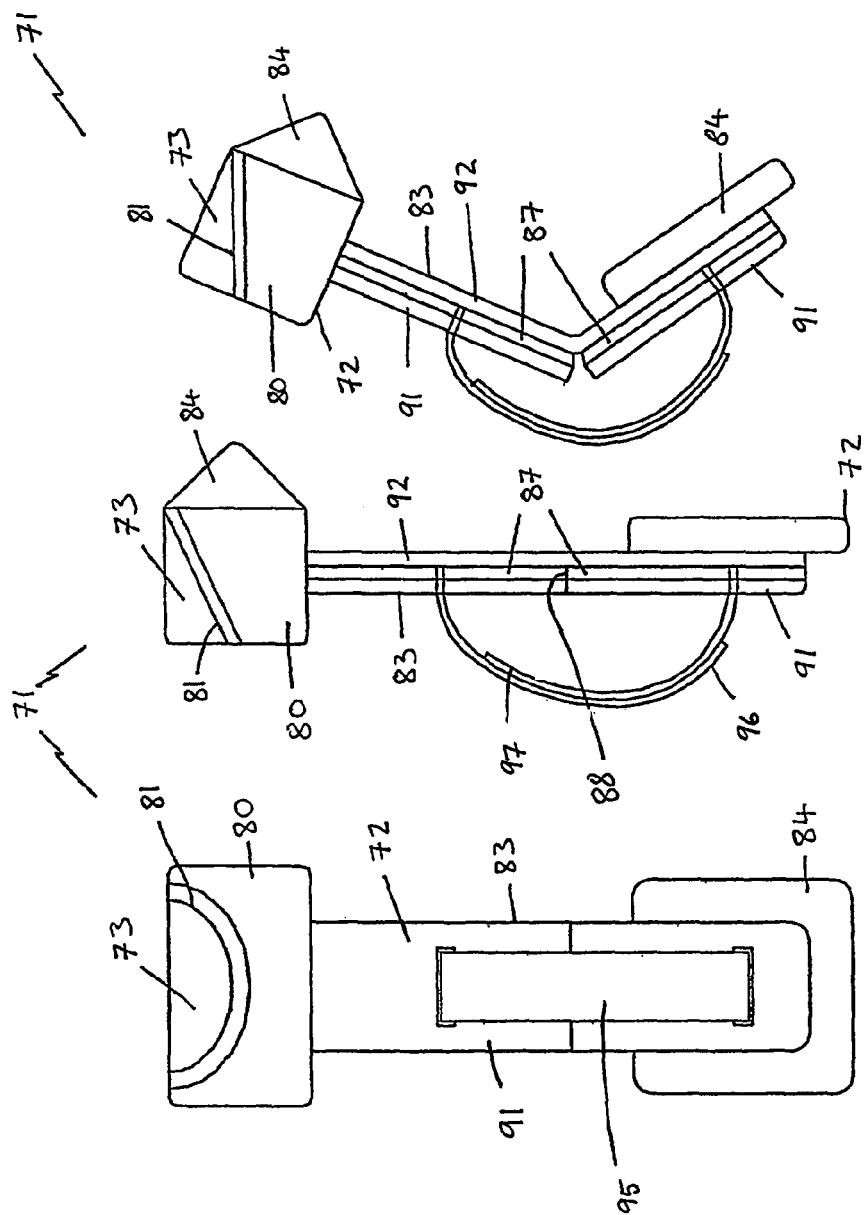

HEAD SUPPORT

Related application Ser. No. 12/097,702, filed Dec. 18, 2006, currently pending, is directed to a light weight combination carrier unit and head support apparatus for use in confined spaces.

CROSS-REFERENCE TO RELATED APPLICATION

This application is a 35 USC 371 application of PCT/GB 2005/002429 filed on Jun. 20, 2005.

BACKGROUND OF THE INVENTION

The present invention relates to a head support and in particular to a light weight head support for use in confined spaces.

Due to increased volumes of traffic on the road and rail infrastructures and increased volumes of national and International airline flights, a greater number of passengers spend an increasing number of hours travelling which generally involves sitting in confined spaces. These spaces are particularly uncomfortable if a passenger is required to rest in an upright sitting position for prolonged periods of time for example on a long haul flight in an economy class aeroplane seat. Passengers encounter problems with trying to sleep under these conditions and one problem occurs as a direct result of the weight of the passengers' heads. When a person starts to slip into a light sleep, the muscles of the neck relax and the head drops suddenly causing a small shock to the body of the passenger as a result of the jerking motion and the passengers' tight sleep is broken. This cycle is repeated generally until the passenger finds a position where the weight of the head has at least partial support avoiding the jerking action of the head. The problem with this type of resting position is that the passenger often wakens up with a strain in their neck muscles.

OBJECT AND SUMMARY OF THE INVENTION

It is an object of the present invention to obviate or mitigate the above outlined problem.

Accordingly, the present invention provides a head support having a body with a recess defined along a recess edge of the body for receiving a person's lower jaw, a torso engaging edge of the body opposite the recess edge being formed for engaging a portion of the person's body when the person is sitting in a substantially upright position preventing the recess from falling away from the lower jaw area of the person.

In general, the person is a passenger but the invention is not limited to use by passengers. The invention is also suitable for use by people such as medical patients with back or neck or other injuries which requires the person to have their head supported upright. The invention is also suitable for people with nocturnal breathing difficulties such as asthma which often requires them to sit in an upright position to avoid breathing problems while sleeping.

Advantageously, the weight of the person's head is transmitted through the head support back to their own body with the head support acting as a strut.

Ideally, the head support has a short body so that the torso engaging edge of the body rests against the upper chest area of a person in use.

Preferably, the head support has an elongated body so that the torso engaging edge of the body rests against the stomach region of a person in use.

Advantageously, the head support with the elongated body has a greater surface area resting against the person's body which generates additional friction further preventing the recess falling away from the person's lower jaw area.

Ideally, a recess is provided in two opposite edges of the body.

Beneficially, the head support can be used upside down.

Preferably, each edge of the body has a recess.

Ideally, the body has an external surface resting against a person's chest area in use and a distal surface distal from a person's chest area in use.

Preferably, means for releasably securing a passenger's arms onto the distal surface of the body are provided.

Ideally, the securing means comprises a cruciform element with four arms, the four free ends of the arms extending out of the main plane of the cruciform element in the same direction and being attached at or about four edges of the distal surface of the body in a spider-like configuration, the distal surface and the spider-like cruciform element defining an open chamber therebetween having four apertures for receiving the arms of the person.

Advantageously, this embodiment provides support for a person's arms during sleeping in a confined space and the person is encouraged to sleep in the natural foetal position.

Ideally, a stiffening member is disposed within the body of the head support.

Preferably, the head support is an inflatable body.

Ideally, the body of the head support is manufactured from foam.

Preferably, the foam is at least partially covered with a material having a high coefficient of friction.

Ideally, the head support is a combination of a foam insert coated with an outer skin.

Preferably, the recess has a hemi-conical surface expanding from the proximal surface to the distal surface with the hemi-conical surface having a longitudinal axis substantially orthogonal to the main plane of the body.

Ideally, the body has a protuberance extending rearward from the body at or about the same location of the body as the recess.

Preferably, the securing means comprises a cruciform element with four arms, the four free ends of the arms extending out of the main plane of the cruciform element in the same direction and being attached at or about four edges of the distal surface of the body in a spider-like configuration, the distal surface and the spider-like cruciform element defining an open chamber therebetween having four apertures for receiving the arms of a person.

Ideally, the securing means is at least one adjustable strap.

Preferably, the bottom portion of the body tapers to the torso engaging edge to provide a stake like effect to prevent the body sliding down a person's torso in use.

Ideally, the head support has a body comprising a head element, an elongate spinal element and a body engaging element.

Ideally, the elongate spinal element has a two-piece rigid board with preferably a hinge between the two-pieces of board to allow the spinal element to fold over onto itself.

Preferably, the two piece board is covered with foam strips front and back respectively with preferably the front strip of foam being split in alignment with the hinge.

Ideally, the body engaging element is mounted on the elongate spinal element distal from the head element and comprises a block of foam for engaging a person's stomach region to define the second point of connection on a person's body to allow the head support to act as a strut.

Preferably, a single strap is connected to the two piece board at both sides of the hinge and the single strap has two free ends carrying fastening members.

The present invention also provides a garment of clothing for a person's torso having a head support incorporated thereinto, the head support extending from the neck region to the stomach region of the garment of clothing, the head support having a body with a recess defined along a recess edge of the body for receiving a person's lower jaw, a torso engaging edge of the body opposite the recess edge being formed for engaging a portion of the person's torso when the person is sitting in a substantially upright position preventing the recess from falling away from the lower jaw area of the person in use.

Ideally, when the garment of clothing has a zipper centrally mounted thereon in alignment with the longitudinal axis of the wearer, the head support is split about a centre line extending along the longitudinal axis of the head support so that one half of the split head support is carried by the garment on one side of the zipper and the other half of the split head support is carried by the garment on the other side of the zipper.

BRIEF DESCRIPTION OF THE DRAWINGS

This invention will now be described with reference to the accompanying drawings which show, by way of example only, three embodiments of the head support in accordance with the invention, in the drawings:

FIG. 12 is a front elevational view of a second embodiment of a head support;

FIG. 13 is a side elevational view of the second embodiment of the head support of FIG. 12;

FIG. 14 is a front elevational view of a third embodiment of the head support;

FIG. 15 is a first side elevational view of the third embodiment of the head support; and FIG. 16 is a second side elevational view of the third embodiment of the head support.

DESCRIPTION OF THE PREFERRED EMBODIMENT

Figure 1:
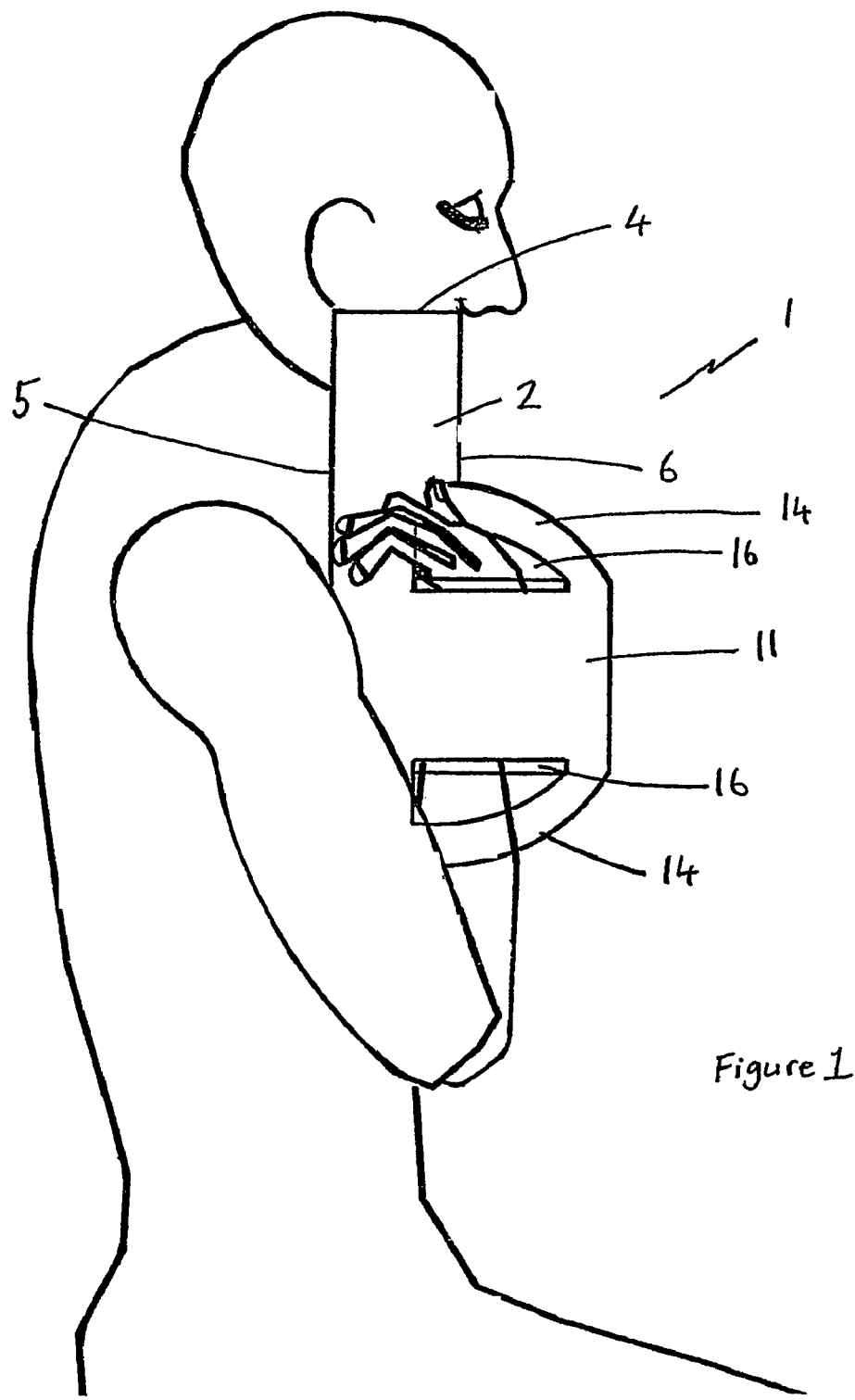
FIG. 1 is a side elevational view of a first embodiment of a head support in use.
Figure 2:
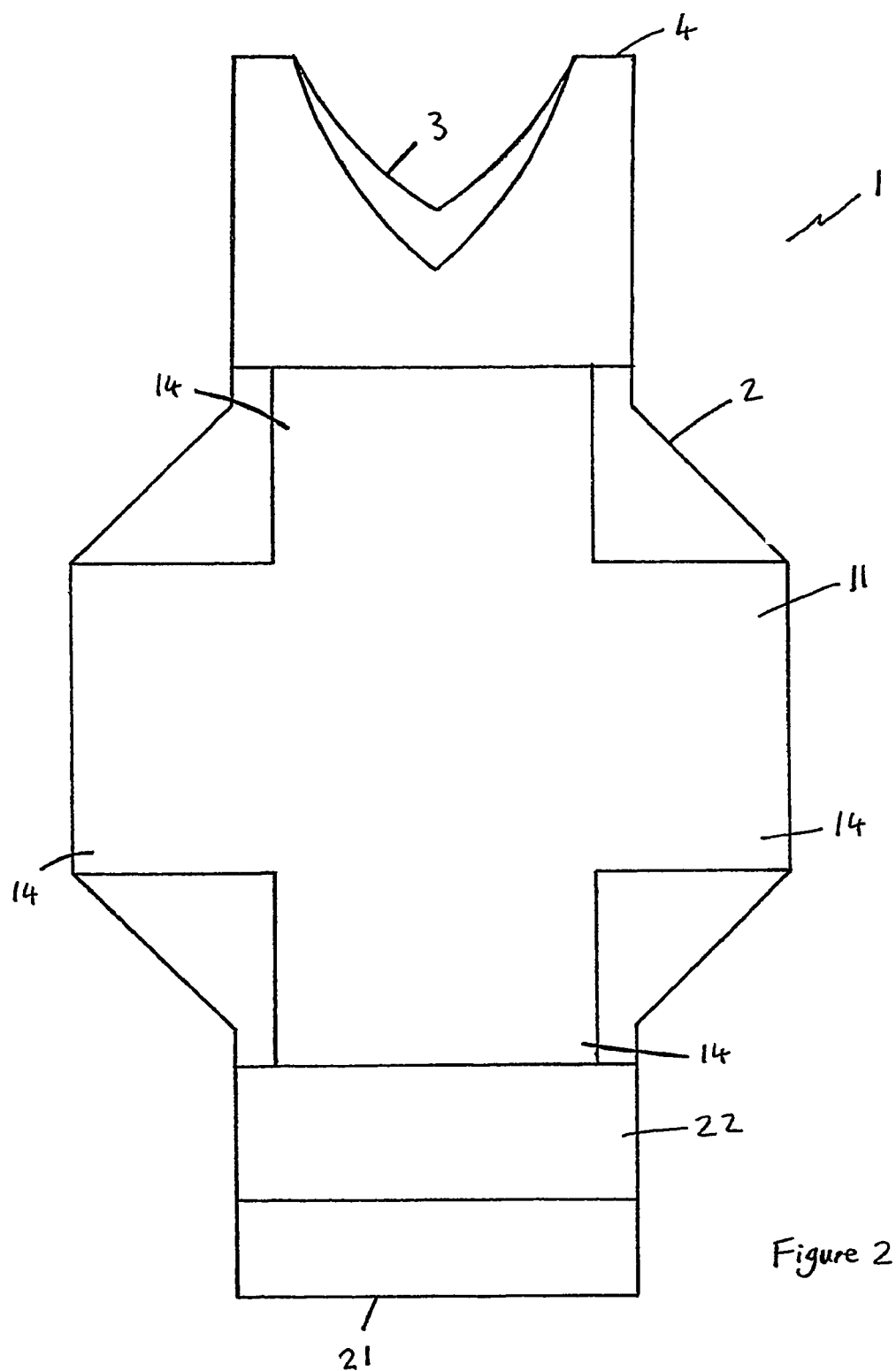
FIG. 2 is a front elevational view of the head support of FIG. 1.
Figure 3:
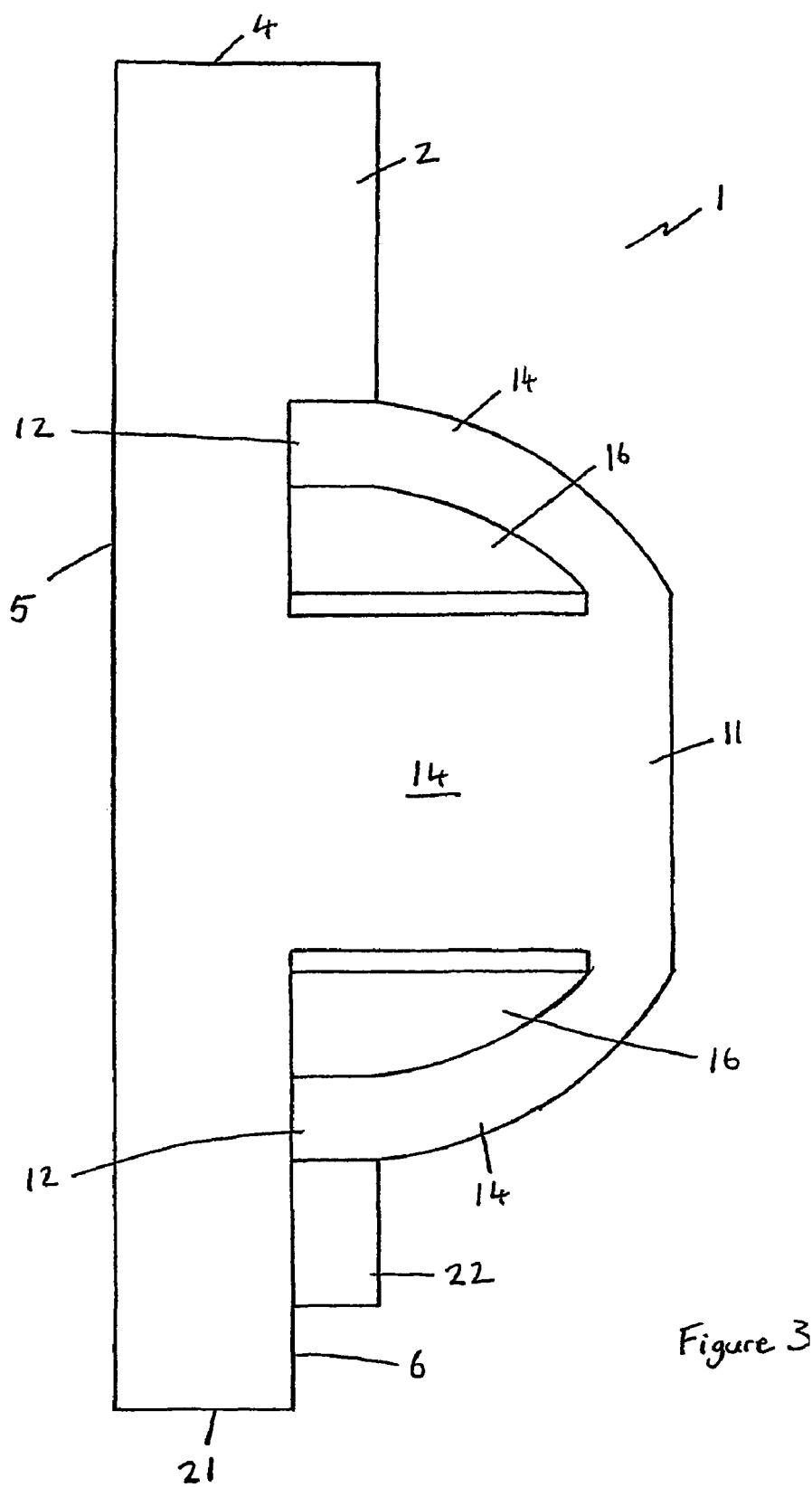
FIG. 3 is a side view of the head support of FIGS. 1 and 2.
Figure 4:
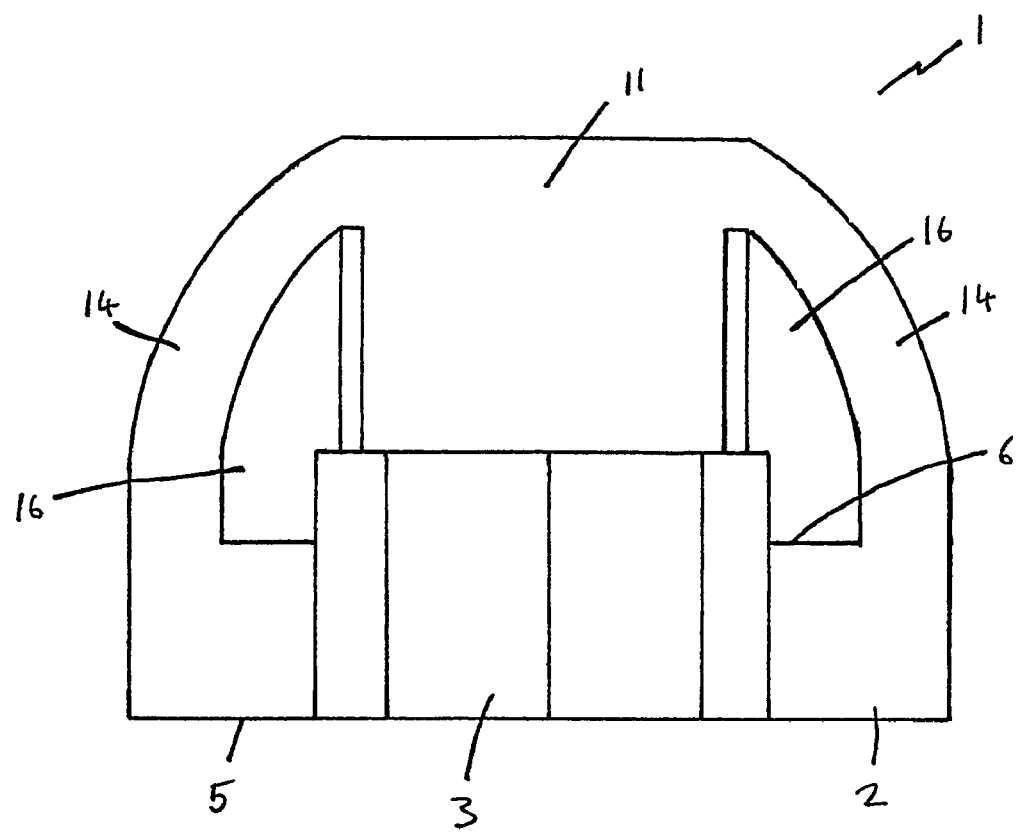
FIG. 4 is a top plan view of the head support of FIGS. 1 to 3.
Figure 5:
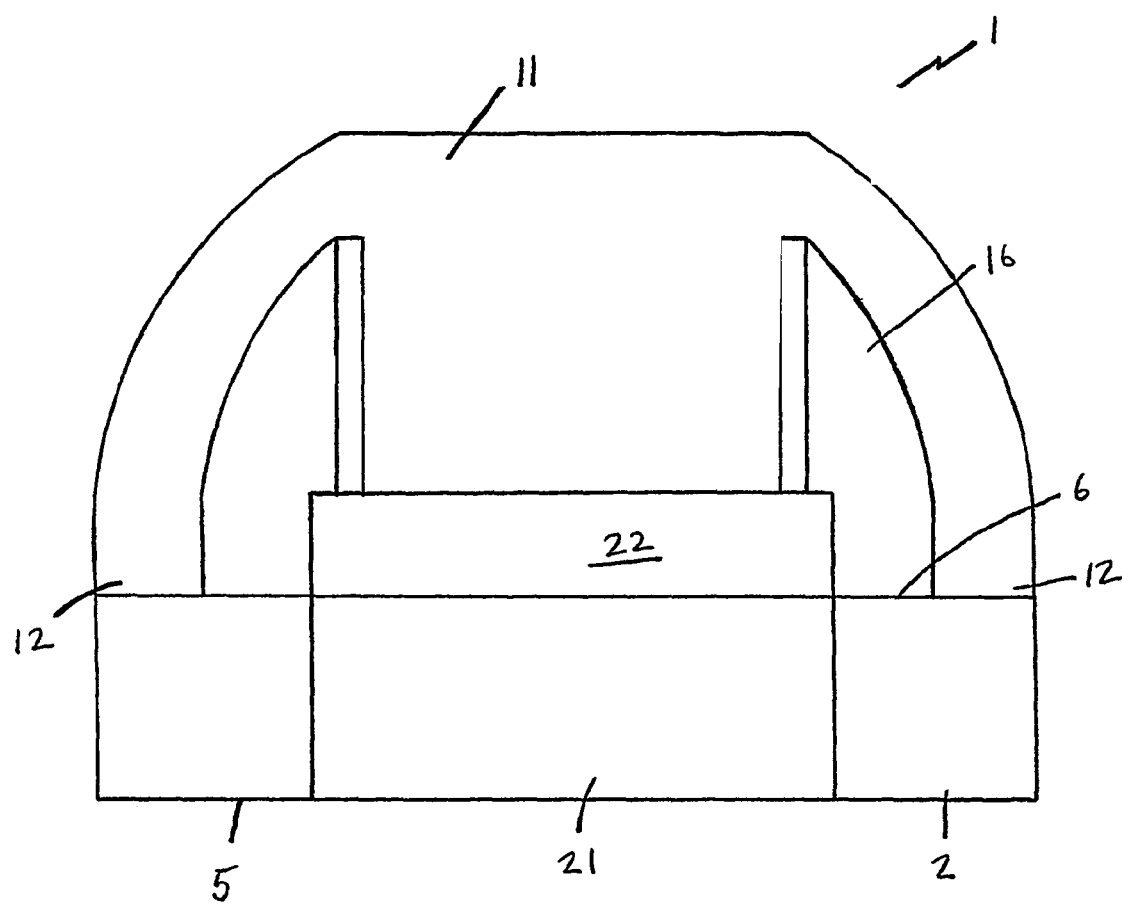
FIG. 5 is a bottom plan view of the head support of FIGS. 1 to 4.

Referring initially to FIGS. 1 to 11, there is shown a head support indicated generally by the reference numeral 1. The head support 1 has a body 2 with a recess 3 (see FIGS. 2, 4, 6, 7, 8 and 9) along a recess edge 4 of the body 2. The recess 3 is generally v-shaped for accommodating a person's lower jaw although any shape of recess 3 capable of performing the function of supporting the lower jaw is suitable for use with the head support 1. The body 2 (see FIGS. 3 and 7) has a proximal planar surface 5 which rests against a person's chest region in use and a distal planar surface 6 which is distal from the person's body in use.

A spider-like cruciform element 11 has four arms 14 extending in the same direction out of the main plane of the cruciform element 11 and is mounted onto the distal planar surface 6 of the body 2 at the four outer ends 12 of the arms 14. The spider-like cruciform element 11 and the distal planar surface 6 define a cavity 15 with four apertures 16 which allow a person to criss-cross their arms through diametrically opposed apertures 16 as shown in FIG. 1.

A torso edge 21 of the body 2 opposite the recess 3 has an insert 22 for improving the strength of this edge 21 to mitigate against deformation.

Figure 6:
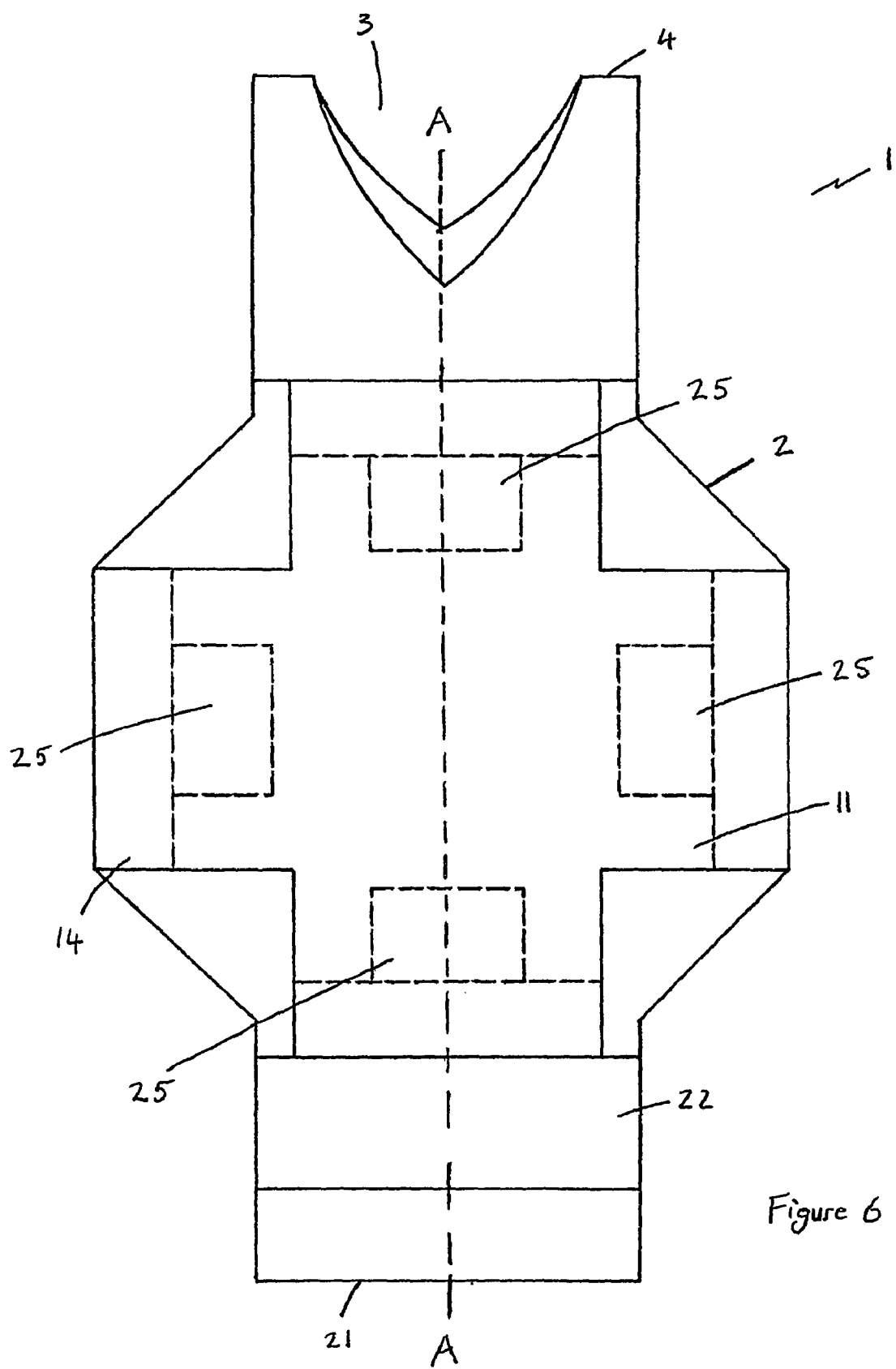
FIG. 6 is the same front elevational view as FIG. 2 showing internal support members.
Figure 7:
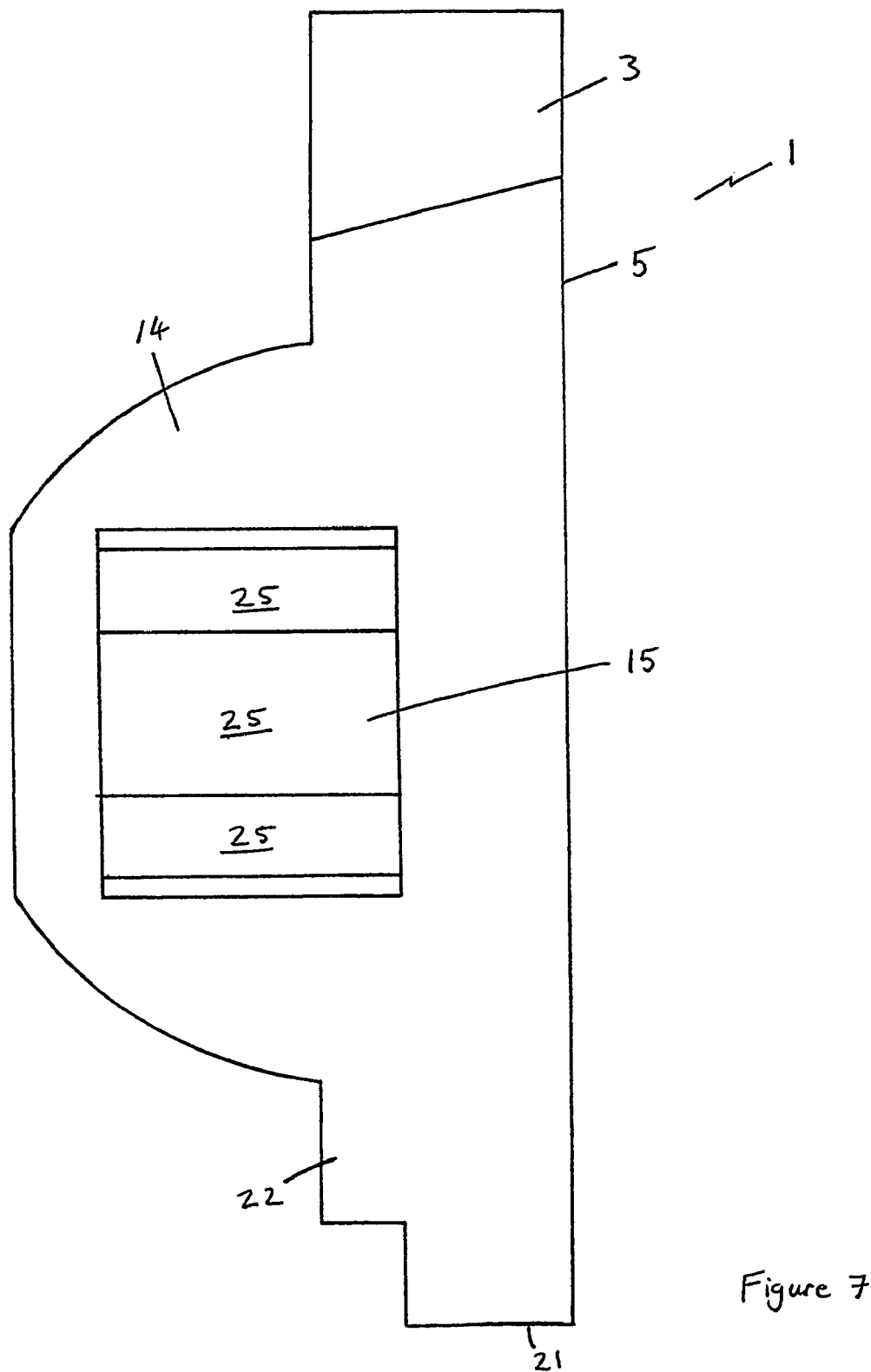
FIG. 7 is a sectional view of FIG. 6 taken along A-A.
Figure 8:
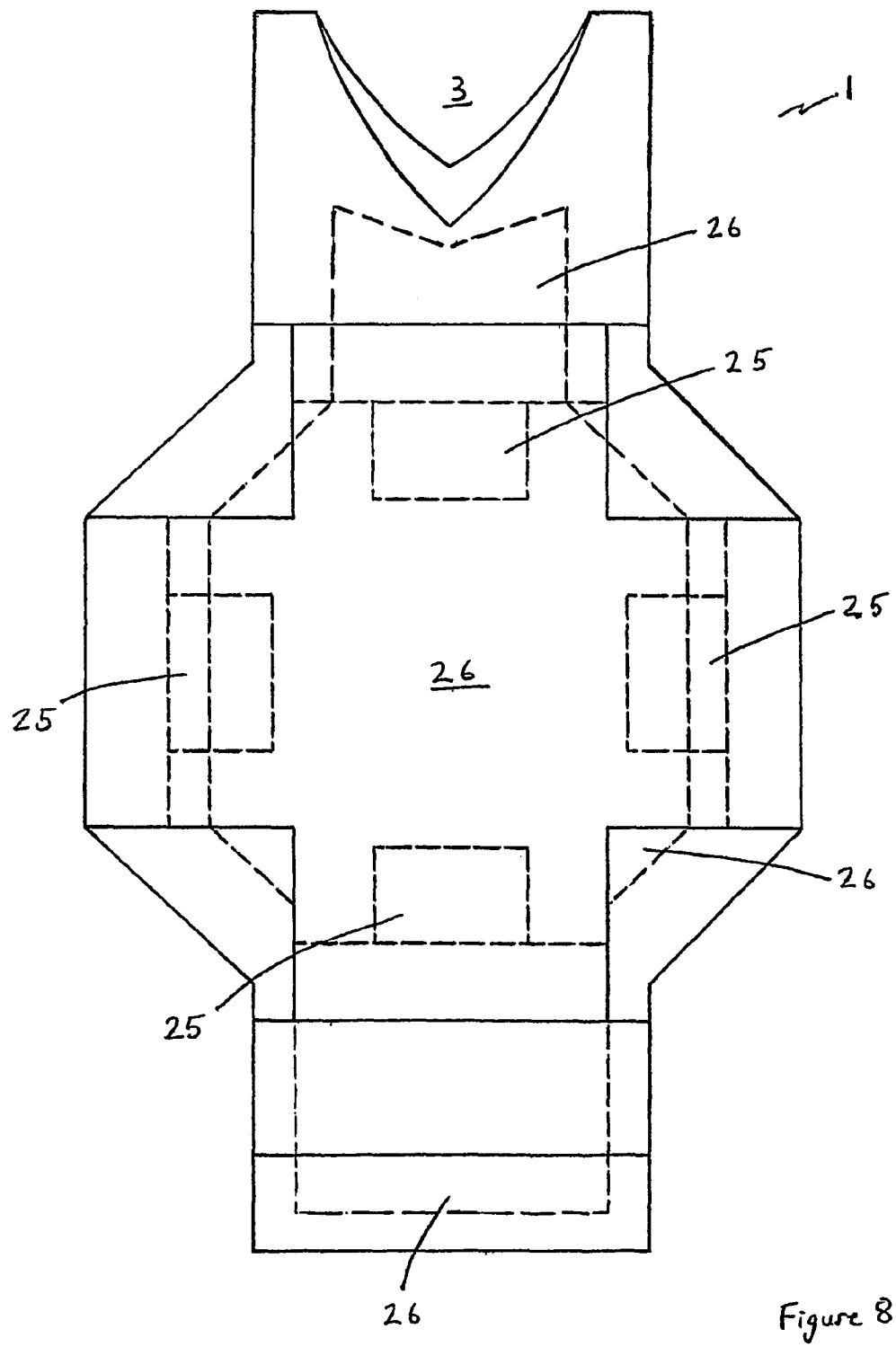
FIG. 8 is the same front elevational view as FIG. 6 showing an internal stiffening member.
Figure 9:
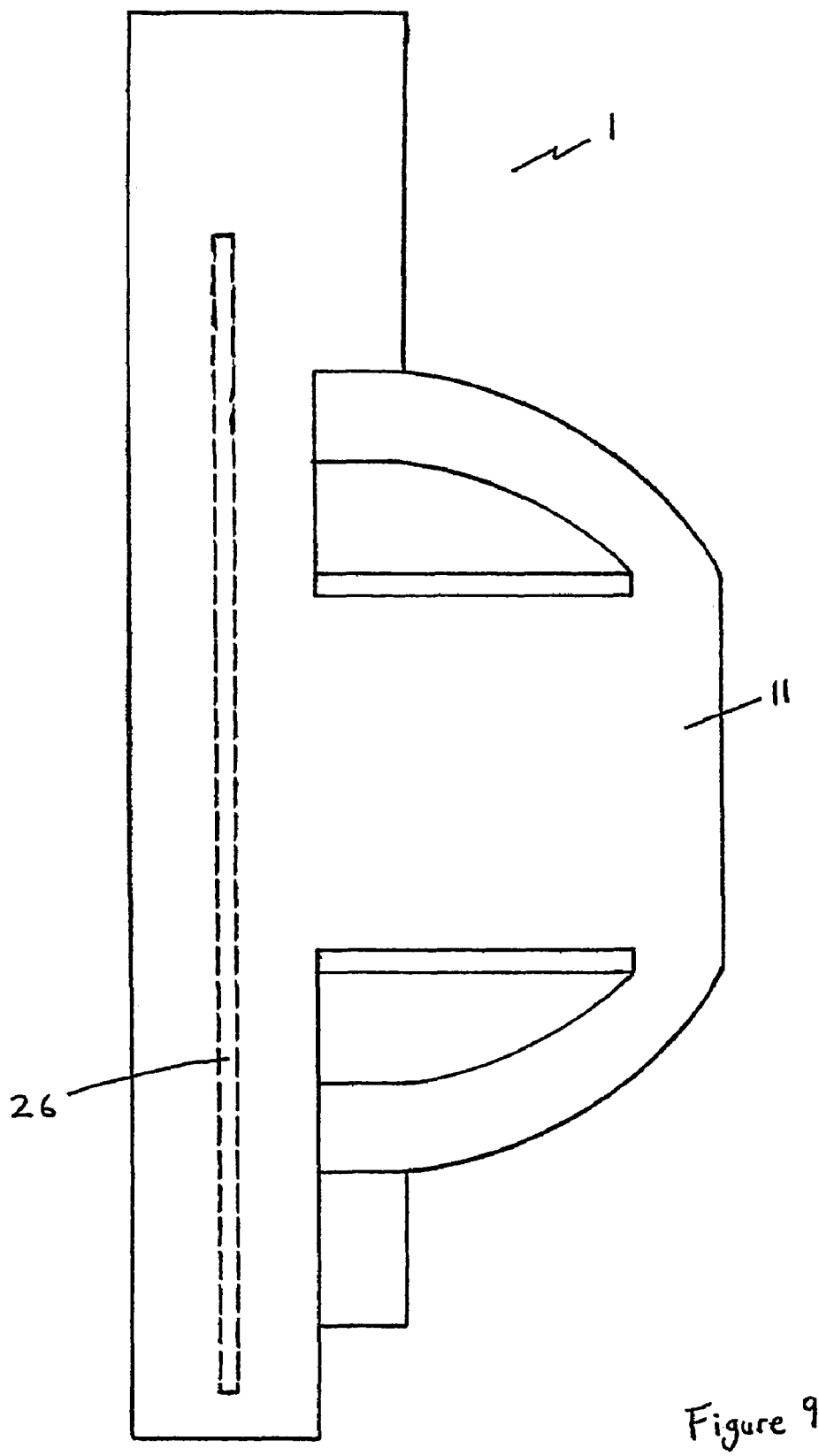
FIG. 9 is a side elevational view of FIG. 8.
Figure 10:
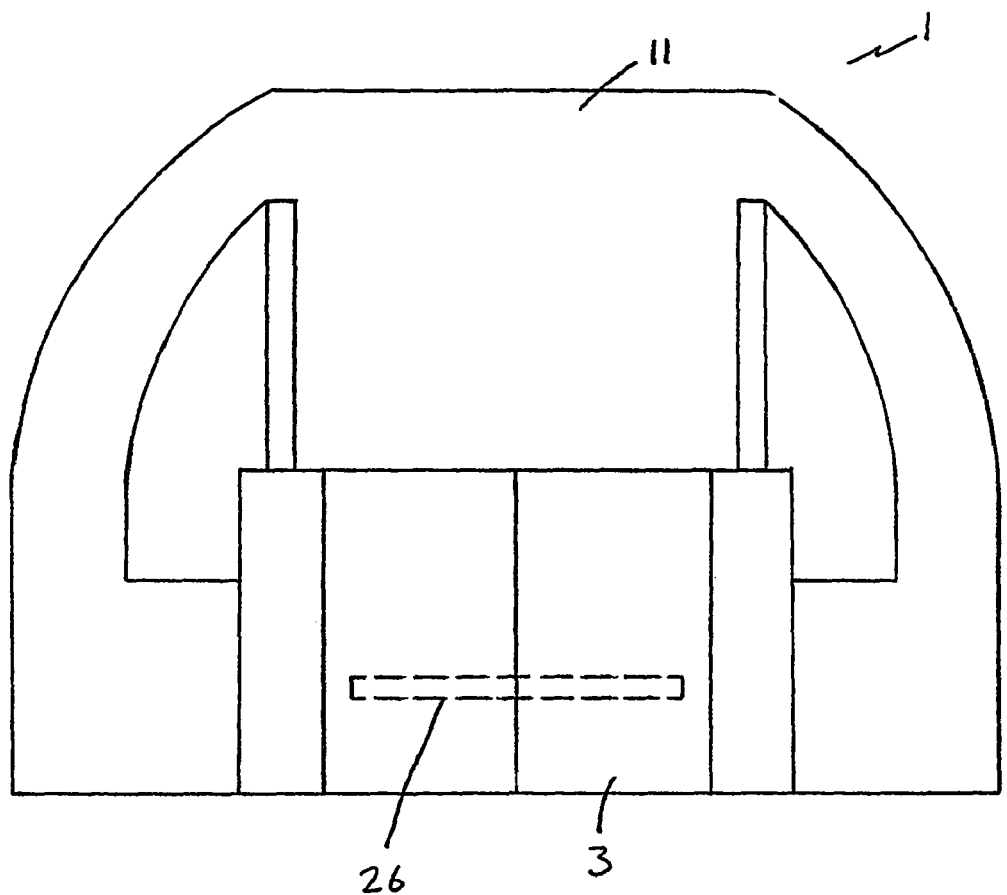
FIG. 10 is a top plan view of FIG. 8 and FIG. 9.
Figure 11:
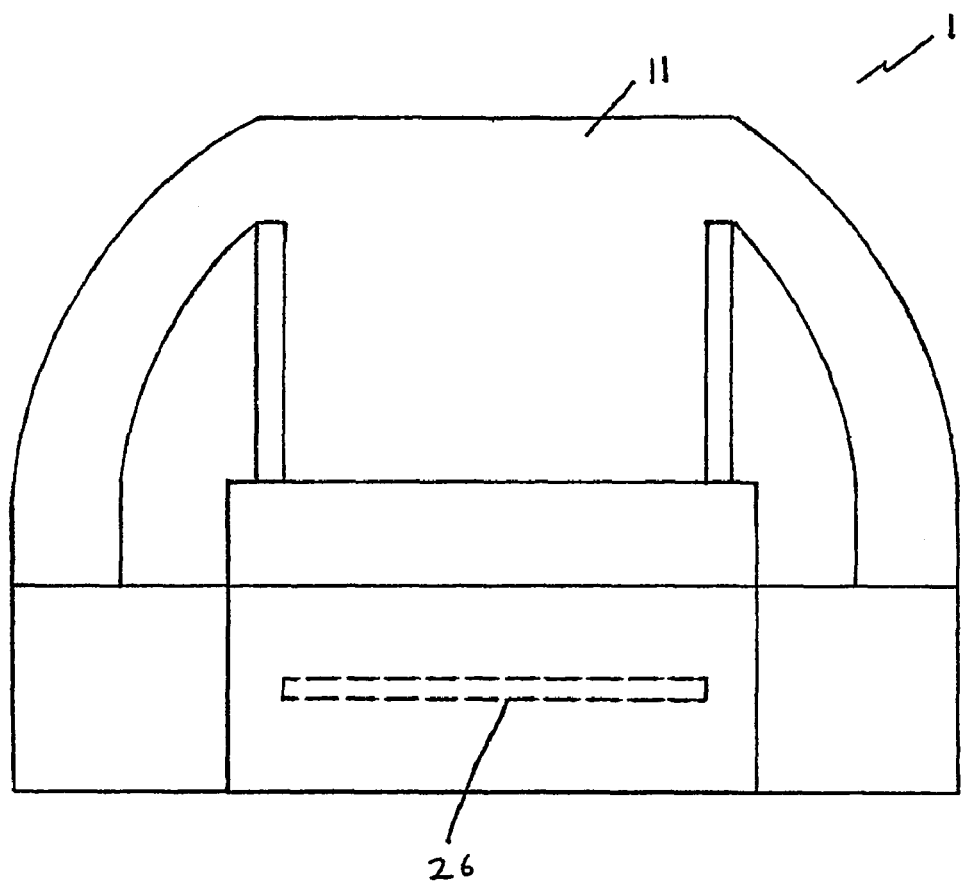
FIG. 11 is a bottom plan view of FIGS. 8 to 10.

FIG. 6 and FIG. 7 show blocks 25 which are disposed between the arms 14 of the cruciform element 11 and the distal surface 6 of the body 2. These blocks 25 improve the overall structural integrity of the head support 1.

FIGS. 8 to 11 show a stiffening board 26. The stiffening board 26 prevents deformation of the head support I and is an optional feature.

Referring now to FIGS. 12 and 13, there is shown a second embodiment of a head support indicated generally by the reference numeral 101. The head support 101 has a body 102 with a recess 103 along a recess edge 104 of the body 102. The recess 103 is semi-circular in shape although the recess 103 can be any shape provided it is capable of performing the function of accommodating a person's lower jaw in use. The body 102 has a proximal planar surface 105 which rests against a person's chest in use and distal planar surface 106 which is distal from the person's body in use. The recess 103 has a hemi-conical surface 108 expanding from the proximal planar surface 105 to the distal planar surface 106 with the recess 103 having a longitudinal axis substantially orthogonal to the main plane of the body 102.

The body 102 has a protuberance 111 extending rearward from the proximal planar surface 105 at or about the same location of the body 102 as the recess 103. The effect of the protuberance 111 is to propel the hemi-conical surface 108 of the recess 103 up and out from the person's neck to hold the person's head in the most upright position possible within the geometrical constraints imposed by the width of the body 102 and the width of the protuberance 111. Otherwise, the weight of the person's head may compress the deformable recess portion negating the desired effect of the head support 101. The body 102 of the head support 101 is a foam body in this embodiment. It will be appreciated that the body of the present invention may be an inflatable body formed of a substantially airtight inflatable outer skin with a high coefficient of friction or a combination of a foam insert coated with an outer skin of plastic or some similar suitable material. The foam body 102 of FIGS. 12 and 13 has two pairs of openings 115, 116 and two straps 117, 118. Strap 118 passes through the pair of openings 115 and the other strap 117 passes through the other pair of openings 116. The straps 117, 118 are open ended and have fastening members on their free ends 119 to allow a person to adjust the position of straps 117, 118 depending on the size of their arms. The free ends 119 of the straps 117, 118 pass out of the body 102 at the distal planar surface 106 with the straps 117, 118 extending from a first free end 119 through the body 102 via a first opening of the pairs 115, 116, along the proximal planar surface 105 and back through the second opening of the pairs 115, 116 to the distal planar surface 106. The bottom edge 121 of the body 102 tapers to the torso engaging edge 125 to provide a stake like effect to prevent the body 102 sliding down a person's torso in use.

Referring to FIGS. 14 to 16 there is shown a third embodiment of head support indicated generally by the reference numeral 71. The head support 71 has a body 72 comprising a head element 80, an elongate spinal element 83 and a body engaging element 54. The head element 80 has a recess 73 which has a hemi-conical surface 81 for receiving a person's lower jaw. The longitudinal axis of the recess 73 is substantially orthogonal to the main plane of the body 72. A tapered protuberance 84 extends rearward from the head element 80 and performs the same function as the protuberance 111 of FIGS. 12 and 13. The elongate spinal element 83 has a two-piece rigid board 87 with preferably a hinge 88 between the two-pieces of board 87 to allow the spinal element 83 to fold over onto itself for storage or in the event of a person's head lunging forward suddenly as could happen during take-off, landing, heavy turbulence or an accident. The two piece board 87 is covered with foam strips 91, 92 front and back respectively with the front strip 91 of foam being split in alignment with the hinge 88. The body engaging element 84 is mounted on the elongate spinal element 83 distal from the head element 80 and comprises a block of foam for engaging a person's stomach region to define the second point of connection on a person's body to allow the head support 71 to act as a strut. A single strap 95 is connected to the two piece board 87 at both sides of the hinge 88 and the single strap 95 has two free ends 96, 97 carrying fastening members such as Velcro® patches. These fastening members allow the strap 95 to be adjusted to accommodate people with different sizes of arms.

It will also be appreciated that additional belts may be attached to the head support which can extend around the body of a person using the head support.

Variations and modifications can be made without departing from the scope of the invention defined in the appended claims.

The invention claimed is:

1. A head support comprising a body with a recess defined along a recess edge of the body to receive a person's lower jaw, and a torso engaging edge of the body opposite the recess edge being formed to engage a portion of the person's torso when the person is sitting in a substantially upright position to prevent the recess from falling away from the person's lower jaw area,
    wherein the recess edge of the body is a surface of the body, said surface engaging a person's lower jaw when in use,
    wherein the recess is shaped for accommodating a person's lower jaw and is capable of performing a function of supporting a person's lower jaw,
    wherein the body has a proximal surface resting against a person's chest area in use and a distal surface distal from a person's chest area in use,
    wherein the head support further comprises means for releasably securing a person's arms onto the head support, and
    wherein the body comprises a protuberance extending rearward from the body at or about a same location of the body as the recess.

2. A head support according to claim 1, wherein the securing means comprises at least one adjustable strap.

3. A head support according to claim 2, wherein the adjustable strap extends through a pair of openings in the body.

4. A head support according to claim 3, further comprising a second adjustable strap extending through a second pair of openings in the body.

5. A head support according to claim 1, wherein the body is a short body so that the torso engaging edge of the body will rest against an upper chest area of a person in use.

6. A head support according to claim 5, wherein a bottom portion of the body tapers to the torso engaging edge to provide a stake like effect to prevent the body sliding down a person's torso in use.

7. A head support according to claim 1, wherein the body is an elongated body so that the torso engaging edge of the elongated body distal from the recess will rest against a stomach region of a person in use.

8. A head support according to claim 7, wherein a bottom portion of the body tapers to the torso engaging edge to provide a stake like effect to prevent the body sliding down a person's torso in use.

9. A head support according to claim 1, further comprises a recess in two opposite edges of the body.

10. A head support according to claim 9, wherein the recess has a hemi-conical surface expanding from the proximal surface to the distal surface with the hemi-conical surface having a longitudinal axis substantially orthogonal to a main plane of the body.

11. A head support according to claim 1, wherein each edge of the body has a recess.

12. A head support according to claim 11, wherein the recess has a hemi-conical surface expanding from the proximal surface to the distal surface with the hemi-conical surface having a longitudinal axis substantially orthogonal to the main plane of the body.

13. A head support according to claim 1, wherein the body of the head support is manufactured from foam.

14. A head support according to claim 13, wherein the foam is at least partially covered with a material having a high co-efficient of friction.

15. A head support according to claim 1, wherein said means for releasably securing a person's arms onto the head support comprises means on the distal surface for releasably securing a person's arms onto the distal surface of the body.

16. A head support according to claim 1, further comprising a stiffening member disposed within the body of the head support.

17. A head support according to claim 1, wherein the body of the head support is an inflatable body.

18. A head support according to claim 1, wherein the body of the head support comprises a foam insert having an outer skin coated thereon.

19. A head support according to claim 1, wherein the recess has a hemi-conical surface expanding from the proximal surface to the distal surface with the hemi-conical surface having a longitudinal axis substantially orthogonal to a main plane of the body.

20. A head support, comprising a body with a recess defined along a recess edge of the body to receive a person's lower jaw, and a torso engaging edge of the body opposite the recess edge being formed to engage a portion of the person's torso when the person is sitting in a substantially upright position to prevent the recess from falling away from the person's lower jaw area,
    wherein the body comprises a protuberance extending rearward from the body at or about a same location of the body as the recess, and
    wherein the body comprises a head element, an elongate spinal element, and a stomach region engaging element.

21. A head support according to claim 20, wherein the elongate spinal element comprises a two-piece rigid board joined by hinge means between two-pieces of board to allow the spinal element to fold over onto itself.

22. A head support according to claim 21, wherein the two-piece board is covered with foam strips front and back respectively with preferably a front strip of foam being split in alignment with the hinge means.

23. A head support comprising:
a body with a recess defined along a recess edge of the body to receive a person's lower jaw,
a torso engaging edge of the body opposite the recess edge being formed to engage a portion of the person's torso when the person is sitting in a substantially upright position to prevent the recess from falling away from the person's lower jaw area, and
means for releasably securing a person's arms onto the head support,
wherein the securing means comprises a cruciform element with four arms, free ends of the four arms extending out of a main plane of the cruciform element in a same direction and being attached at or about four edges of a distal surface of the body in a spider-shape configuration, the distal surface and the cruciform element defining an open chamber there between having four apertures for receiving the arms of a person.

24. A head support according to claim 23, wherein the body engaging element is mounted on the elongate spinal element distal from the head element and comprises a block of foam for engaging a person's stomach region to define a second point of connection on a person's body to allow the head support to act as a strut.

25. A head support according to claim 23, wherein a single strap is connected to the two-piece board at both sides of the hinge means and the single strap has two free ends carrying fastening members.

* * * * *